May 31, 1955 A. G. HUPP 2,709,493
DRIVE CONTROL FOR GARDEN TRACTORS
Filed Aug. 25, 1949 4 Sheets-Sheet 1
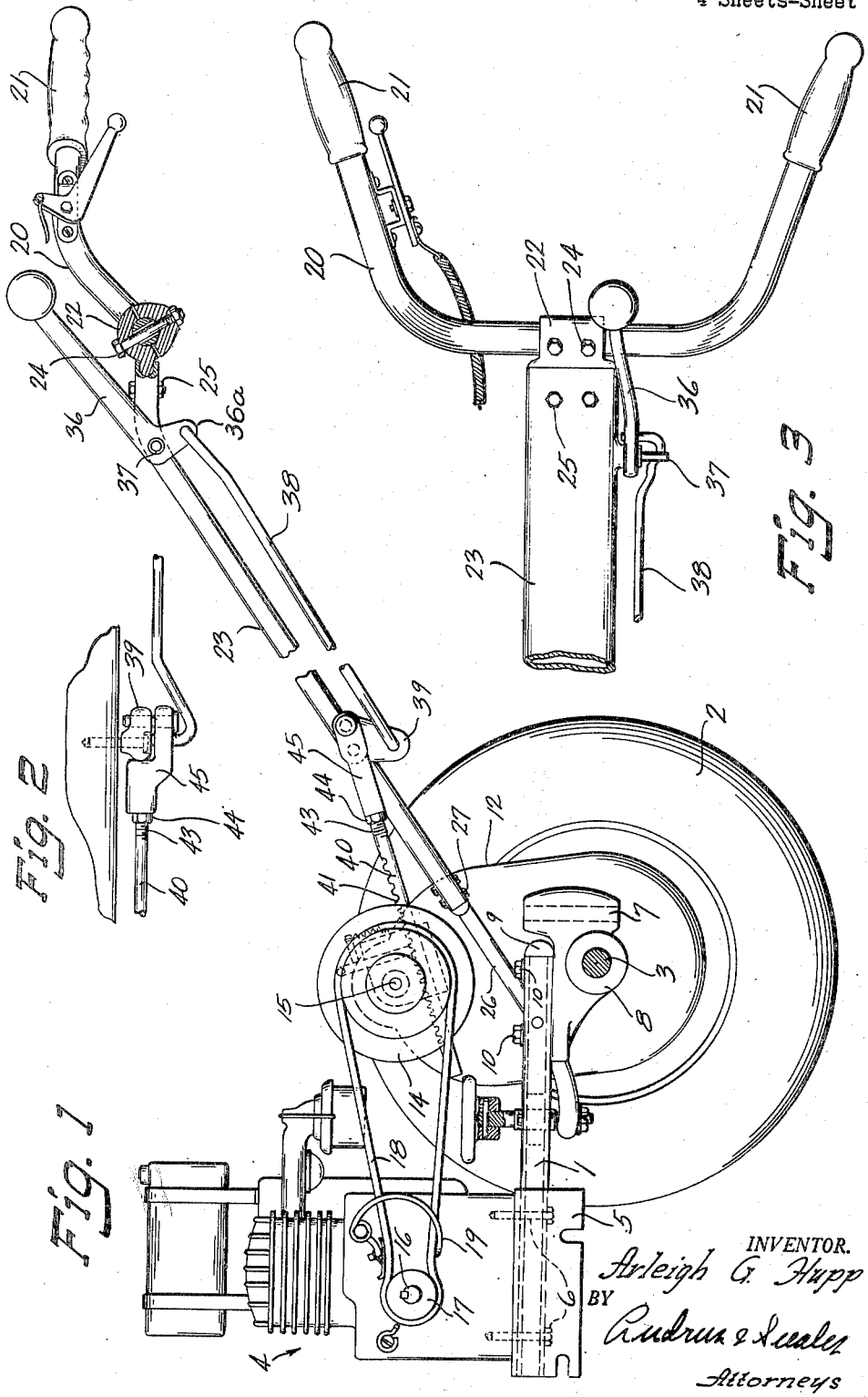
INVENTOR.
Arleigh G. Hupp
BY
Andrus & Sceales
Attorneys May 31, 1955          A. G. HUPP          2,709,493

DRIVE CONTROL FOR GARDEN TRACTORS

Filed Aug. 25, 1949          4 Sheets-Sheet 2

INVENTOR.
Arleigh G. Hupp
BY
Attorneys

May 31, 1955
A. G. HUPP
2,709,493
DRIVE CONTROL FOR GARDEN TRACTORS
Filed Aug. 25, 1949
4 Sheets-Sheet 3
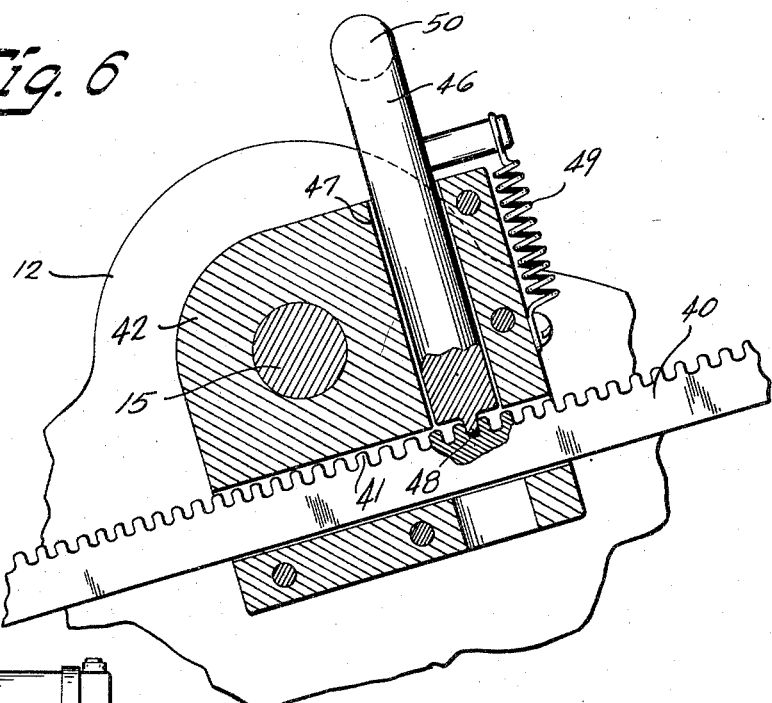
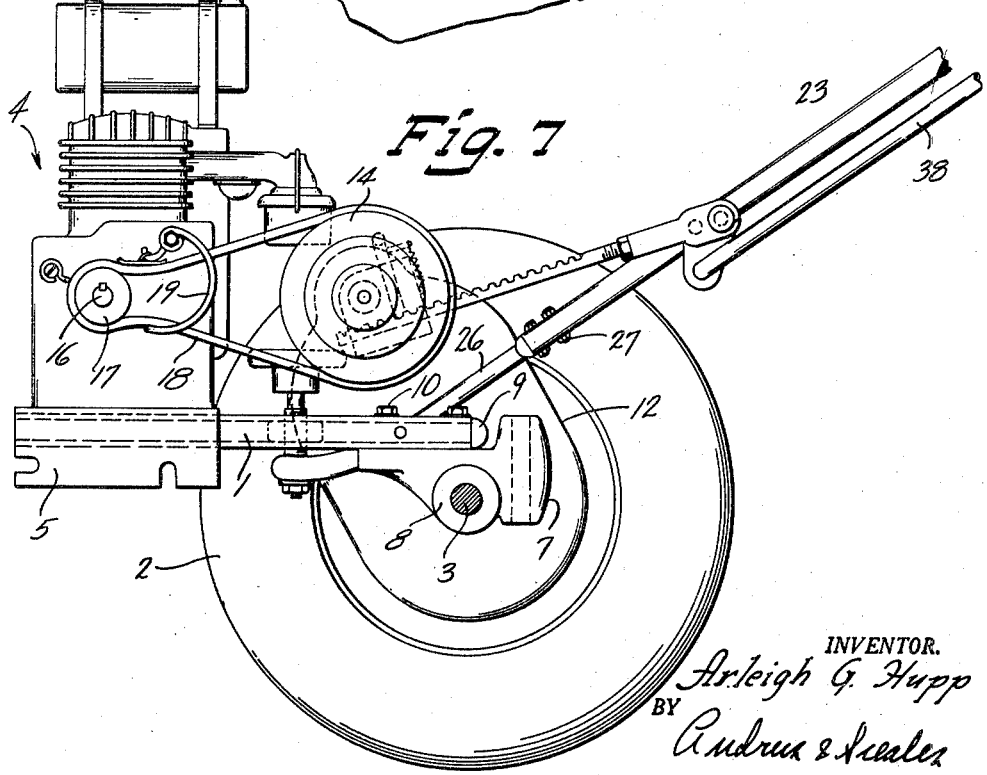

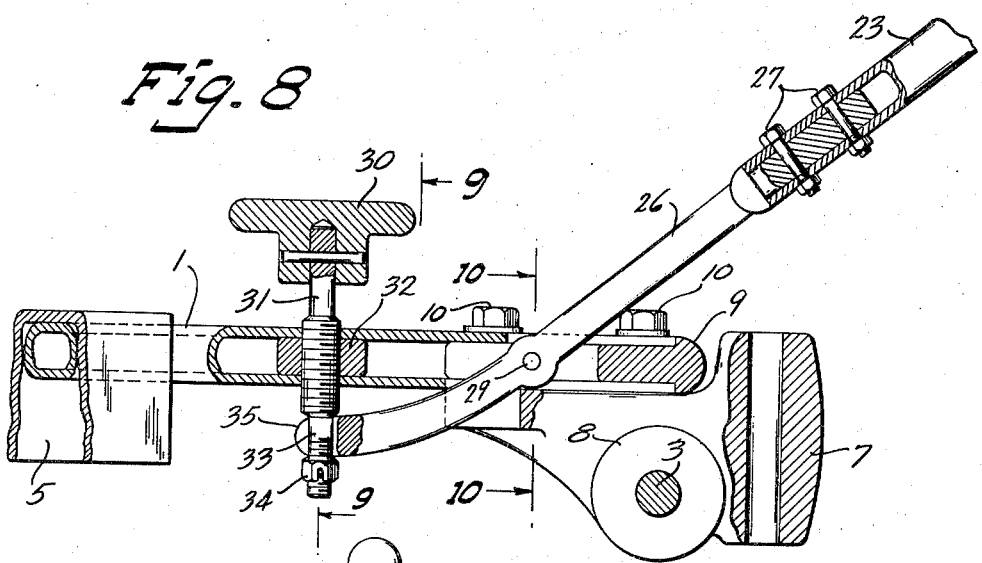
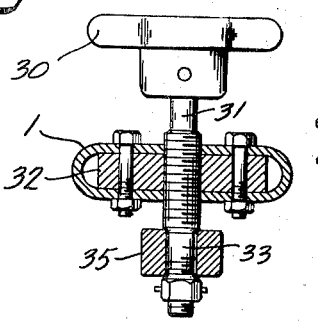
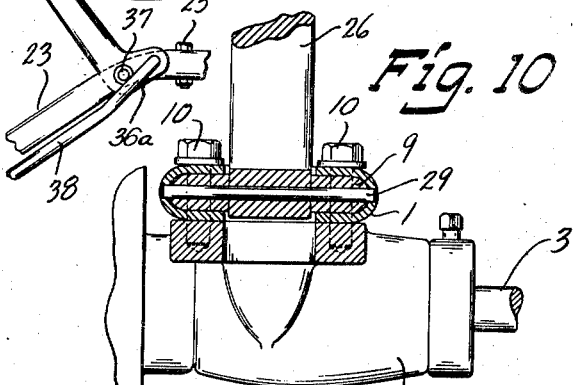
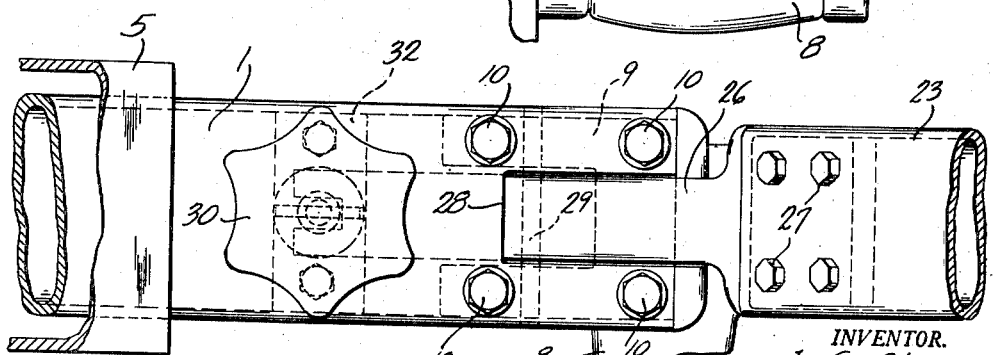

United States Patent Office 2,709,493
Patented May 31, 1955

2,709,493

DRIVE CONTROL FOR GARDEN TRACTORS

Arleigh Glynn Hupp, Milwaukee, Wis., assignor to The Midland Company, South Milwaukee, Wis., a corporation of Wisconsin Application August 25, 1949, Serial No. 112,252

5 Claims. (Cl. 180—19)

This invention relates to a two-wheel garden tractor of light weight and which is adapted to be operated either by a one-and-a-half or a three horse power internal combustion engine, as shown in the copending application, Serial No. 37,281, filed July 6, 1948, now Patent No. 2,576,605 granted the present inventor.

One of the principal objects of the invention is to provide such a tractor with a simple, rugged and easily operated manual belt tightener which serves to control the power drive for the wheels.

A further object is to control more positively the tightening of the belt and to provide for the immediate release of the belt on the pulleys upon moving the control lever forwardly of the operator.

Another object of the invention is to provide different speeds for the tractor.

Another object is to provide for rapid adjustment of the belt tightener mechanism to accommodate multiple sheave belt adjustments.

Another object is to provide a stronger and more rugged handle structure and adjustment for mounting of the several control members.

These and other objects and advantages of the invention will be more fully set forth in the following description thereof as illustrated in the accompanying drawings.

In the drawings:

Figure 1 is a side elevation of the tractor showing the drive belt on the intermediate-speed pulley;

Fig. 2 is an enlarged plan view of a part of the drive control mechanism;

Fig. 3 is an enlarged plan view of the upper end of the control column and handle bars;

Fig. 6 is an enlarged sectional view of the belt adjustment means taken on line 6—6 of Fig. 4;

Fig. 7 is a view similar to Fig. 5 showing the belt adjusted for low speed operation;

Fig. 8 is an enlarged view in side elevation of the handle adjustment with parts broken away and sectioned;

Fig. 9 is a sectional view taken on line 9—9 of Fig. 8;

Fig. 10 is a sectional view taken on line 10—10 of Fig. 8;

Fig. 11 is an enlarged plan view of the handle adjustment shown in Fig. 8; and

Fig. 12 is a detail view of the upper operating lever for the drive, showing the same in neutral position.

Figure 4:
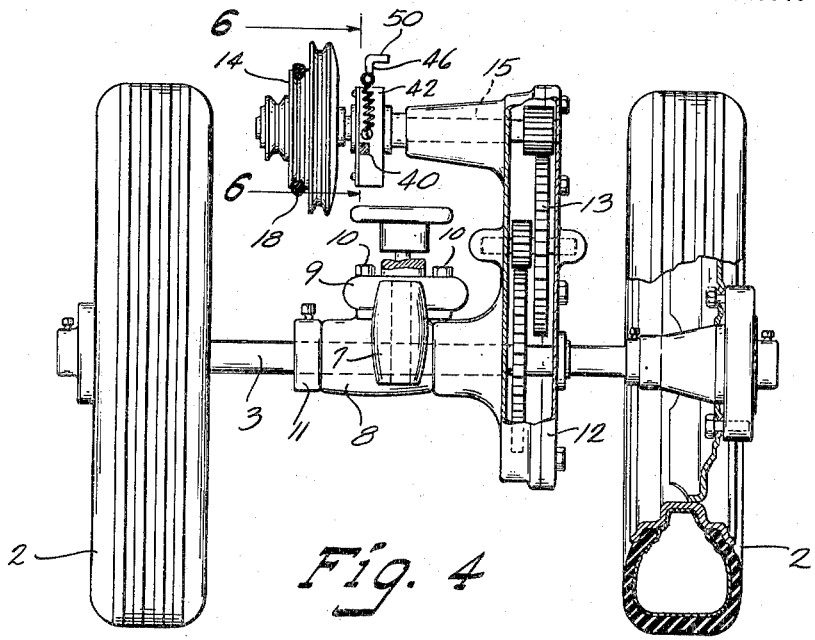
Fig. 4 is a rear elevation of the tractor with the control column broken away to show the transmission gearbox in full.
Figure 5:
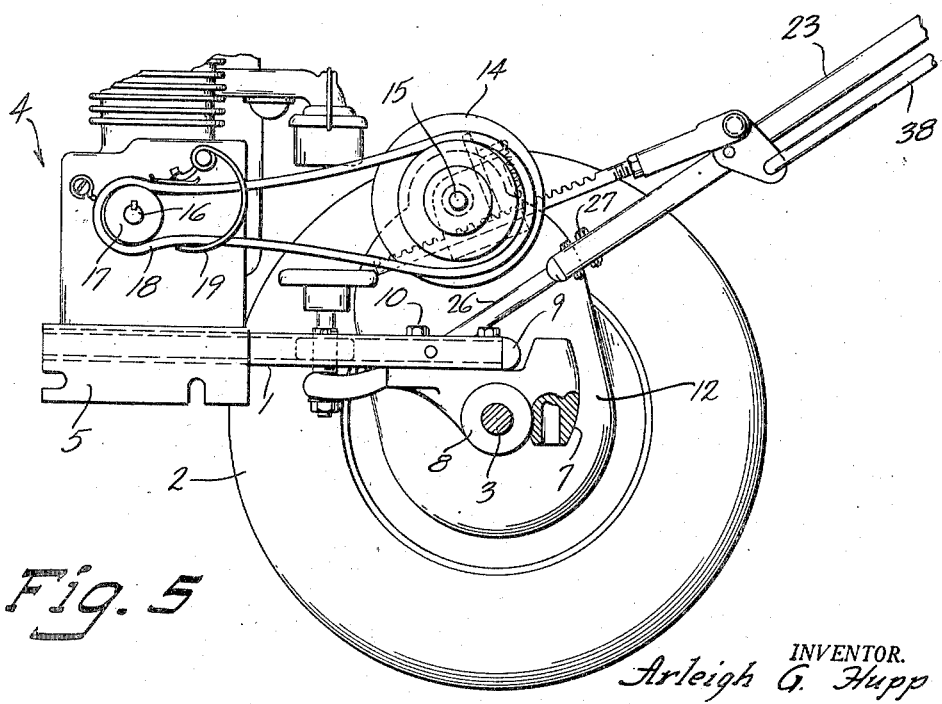
Fig. 5 is a view similar to Fig. 1 showing the belt loosened on the pulleys and in the "neutral" position.

The garden tractor shown in the drawings comprises the tubular longitudinal frame 1 which is supported by the wheels 2 on the axle 3. The internal combustion engine 4 for driving the tractor is mounted at the forward end of frame 1 and well forwardly of wheels 2 for added axle loading and better traction of the wheels.

The hitch 5 is secured intermediate the frame 1 and engine 4 by the bolts 6 extending through the frame. Hitch 5 is disposed forwardly to receive interchangeably various gardening tools, not shown, for use with the tractor. The draw-bar hitch 7 disposed rearwardly of axle 3 is formed integrally with the axle-bearing member 8. Member 8 has a planiform upper surface upon which the rear end of frame 1 and the casting 9 closing frame 1 is secured by means of the bolts 10 extending therethrough.

The collar 11 on one side of member 8 and the gearbox 12 on the opposite side thereof maintain member 8 in position on axle 3, as shown in Fig. 4.

Gearbox 12 houses the train of gears 13, which provides for a substantial reduction drive between the multiple stepped pulley 14 mounted on shaft 15 carried by gearbox 12 and the axle 3 which extends through box 12.

Gearbox 12 comprises an integral unit which, with respect to the rest of the tractor, as will be described, is rotatable on axle 3 and is located on one side of member 8 and frame 1 to dispose pulley 14 selectively at various between-centers distances from the output shaft 16 of engine 4 and the multiple drive pulley 17.

The V-belt 18 is adapted selectively to be mounted on corresponding sheaves of pulleys 14 and 17 to drive the tractor within selected power ranges or speed and is provided with the belt tensioning device 19 which is similar to that described and claimed in the above identified copending application, Serial No. 37,281, now Patent No. 2,576,605.

The handle bars 20 comprising a single solid rod are fitted with suitable grips 21 and secured intermediately by the split clamp member 22 at the upper end of the column 23 extending upwardly and rearwardly of the tractor. Bolts 24 extend through member 22 and the intermedaite portion of handle bars 20 to secure the same as desired.

Column 23 comprises a single, rigid tubular member of substantially oval cross-section preferably having its longer axis extending transversely of the tractor to withstand the particularly severe sidewise forces involved in the manipulation of the tractor while providing also the necessary structural strength for lifting the forward or rear end of the tractor as required. The upper end of column 23 is adapted to receive member 22 secured therein by the bolts 25.

The lower extension 26 of column 23 secured by bolts 27 within and closing the lower end of the column extends through an opening 28 in frame 1 and casting 9 and forwardly beneath the frame. Extension 26 is pivotally secured with respect to frame 1 by the pin 29 passing through opening 28. Pin 29 is secured by a press fit in casting 9 and provides limited pivotal adjustment of column 23 by means of the adjustment knob 30.

The threaded member 31 extending vertically through frame 1 and the reinforcement block 32 carries knob 30 at its upper end. The lower reduced end 33 having the adjustable collar-nut 34 extends through the slot 35 formed in the lower end of extension 26 to engage the latter and secures the extension and column 23 relative to frame 1.

By turning knob 30 which moves member 31 up or down in block 32, the angularity of column 23 may be adjusted to dispose handle bars 20 at the desired height for the operator.

The transmission control mechanism includes the lever 36 and the crank 36a which are integrally formed and pivotally disposed on the projecting pin 37 which extends to one side of the upper end of column 23. The rod 38 extends beneath pin 37 and connects crank 36a and the crank 39 at the lower end of column 23.

The square bar 40 having a series of teeth segments 41 in its upper face to form a rack is slidably disposed and carried by the case 42. Case 42 is freely carried by shaft 15 between pulley 14 and the gearbox 12. The end of bar 40 is turned and threaded as at 43 and with lock nut 44 is secured in a threaded hole in the abutment member 45 pivotally connected to crank 39 on column 23.

The locking pin 46 carried within the slideway 47 of case 42 is provided with a tooth 48 which engages between the adjacent segments 41 of rack 40 to secure the latter against relative movement in either direction.

The spring 49 normally biases pin 46 in locking engagement with rack 40 and the projecting handle 50 above case 42 is provided for disengaging the rack for adjustment of the transmission, as will be described.

In adjusting the tractor transmission for the desired operation, lever 36 is first set so that gearbox 12 is moved, as will be more fully described, to its rearward position. Gearbox 12 is then moved forwardly by lifting pin 46 allowing case 42 to slide on rack 40 to a forwardly position so that pulleys 14 and 17 are close together and belt 18 may be easily placed on corresponding sheaves of the pulleys providing the desired power transmission. Gearbox 12 is then shifted rearwardly by again lifting pin 46 until the desired tension of belt 18 is obtained.

Lever 36 is then reset forwardly in the position which disposes pulleys 14 and 17 in the "neutral" position and engine 4 may be started.

Rod 38 is connected to lever 36 so that in the forward ("neutral") position, their pivotal connection passes dead center and rod 38 engages the underside of pin 37.

Through rod 38, crank 39 and rack 40 movement of gearbox 12 as by vibration of the engine which might inadvertently drive the tractor forwardly, is prevented.

To put the tractor into "drive," lever 36 is moved rearwardly so that gear-box 12 and pulley 14 are shifted on axle 3 to tighten belt 18 on pulleys 14 and 17, as predetermined according to the adjustment as described above.

In the drive position, as shown in Figs. 1 and 7, the connection between member 45 and crank 39 moves slightly past dead center when member 45 abuts crank 39, as shown in Fig. 2.

In the operation of the tractor the torque reaction of gearbox 12 to the driving torque of wheels 2 is carried entirely by rack 40 and column 23. The torque reaction is in the form of a counter-rotation of gearbox 12 on axle 3 in a direction which tends to tighten belt 18. Thus, in moving lever 36 into the drive position which moves pulley 14 away from pulley 17 to tighten belt 18 the torque reaction of the gearbox 12 relieves the effort which would otherwise be required to effect the tensioning. As abutment member 45 approaches the dead center of crank 39, the mechanical advantage of lever 36 and crank 36a increases so that the final tightening is easily and positively controlled by lever 36.

When the tractor is under way and it is necessary to disengage belt 18 and the driving connection of pulleys 14 and 17 the mechanical advantage of lever 36 and crank 36a enables the operator to overcome easily the torque reaction of gear-box 12 without having first to throttle engine 4. Particularly when the tractor is under heavy load, throttling of the engine is difficult without stalling the engine before the drive can be disengaged.

It will be noted that the force applied to gearbox 12 to effect disengagement of the drive must overcome the full axle torque at all times and is, in fact, readily accomplished by moving lever 36.

The dead-center connections of the control means thus provides positive control in both the "neutral" and "drive" positions. Lever 36 is readily accessible in cases of emergency and may be quickly "flipped" into neutral when so required and the adjustment of column 20 and handle bars 17 is easily accomplished so that full control of the tractor is afforded with ease.

Rack 40 provides a wide range of different between-centers distances of pulleys 14 and 17 and allows belts of different lengths to be accommodated without shifting engine 4 on frame 1.

Various embodiments of the invention may be employed within the scope of the following claims.

I claim:

1. In a garden tractor and the like having an axle and an engine having a take-off pulley, a transmission assembly comprising a second pulley and a belt adapted to be mounted on said first and second named pulleys, a gearbox unit carrying said second pulley and having a reduction gear train operatively connecting said second pulley and said axle, said unit being movable rotatably with respect to said axle whereby the distance between said pulleys and the operativeness of said belt may be adjusted between drive and neutral positions, a lever arm and crank means, a second crank means connected to said gearbox unit, said crank means being connected in series and connecting said lever and said gearbox unit to move said gearbox unit in either direction in response to movement of said lever, one of said crank means substantially moving into a dead-center relationship at the limit of the movement of said gearbox unit in one direction and the other of said crank means substantially moving into a dead-center relationship at the limit of the movement of said gearbox unit in the opposite direction.

2. In a tractor unit of the class described including an engine having a multiple drive pulley and an axle and a pair of wheels supporting said engine, a belt mounted on said pulley, a transmission unit comprising a gearbox supported for relative rotation on said axle having a multiple pulley adapted to receive said belt and a reduction gear train connecting said pulley and said axle, said last named pulley being disposed rearwardly of said drive pulley, at least one of said pulleys being stepped whereby said belt may be selectively disposed on corresponding pulleys to effect different transmission ratios, said unit being movable rotatably with respect to said axle whereby the distance between said pulleys and the operativeness of said belt may be adjusted to accommodate the adjustment of said belt upon said step pulley and provide for tightening and loosening of said belt for the drive control of said transmission unit, manually operable duplicate crank means connected in series, and an adjustable rod connecting said crank means and said gearbox unit and disposed to move said gearbox unit in either direction, one of said crank means substantially moving into a dead-center relationship at the limit of the movement of said gearbox unit in one direction and the other of said crank means substantially moving into a dead center relationship at the limit of the movement of said gearbox unit in the opposite direction.

3. A garden tractor of the class described comprising a frame, an axle and a pair of wheels supporting said frame, an engine having a drive pulley and carried on said frame, a gear transmission unit carrying a driven pulley and providing a geared reduction drive between said driven pulley and said axle, said unit being supported by said axle independently of said frame and carrying said driven pulley adjacent said drive pulley and movable with respect thereto, a belt of uniform length disposed on said pulleys whereby the driving power output of said engine is transmitted through said unit to said axle and wheels, said pulleys being disposed whereby the rotational thrust reaction of said transmission unit is in a direction effecting a tensioning of said belt, adjustable abutment means supporting said unit against rotation and limiting the tensioning of said belt, a manually operable lever carried by said frame, and crank means operable by said lever and connected to said adjustable abutment means to move said unit against the torque reaction of the unit to effect loosening of said belt on said pulleys, said lever being operable past a dead-center holding position when said unit is moved to one extreme position and said crank means being operable past a dead-center holding position when said unit is moved to the other extreme position whereby said unit is held in either of two selected positions with the belt loose on said pulleys for one position and tight on said pulleys for the other position.

4. In a garden tractor and the like having an axle and an engine having a drive pulley, a gearbox unit having a driven pulley and a reduction gear train operatively connecting the driven pulley and said axle, a belt trained on said pulleys, said unit being rotatable on the axis of said axle between a drive position in which the driven pulley is spaced from the drive pulley so that said belt is in engagement therewith and a non-driving position in which the driven pulley is spaced from the drive pulley so that the belt is disengaged therefrom, a crank carried by the tractor and having a rod connected to said unit, said crank having an over-dead-center position respecting said rod when the unit is in the drive position, and lever arm and crank means connected to said first-named crank and operable by the lever arm, said lever arm and crank means being operable to dispose said crank in said position securing the unit in drive position, and said lever arm and crank means being itself movable to an over-dead-center position to dispose and secure said crank and the unit in non-driving position.

5. In a garden tractor and the like having a two-wheeled axle and a frame supported thereon, a control column pivotally secured to said frame and extending upwardly and rearwardly thereof, means for the pivotal adjustment of the column respecting the frame, an engine mounted on said frame forwardly thereof and having a drive pulley, a gearbox unit having a driven pulley and a reduction gear train operatively connecting the driven pulley and said axle, a belt trained on said pulleys, said unit being rotatable on the axis of said axle between a drive position in which the driven pulley is spaced from the drive pulley so that said belt is in engagement therewith and a non-driving position in which the driven pulley is spaced from the drive pulley so that the belt is disengaged therefrom, a crank carried by said column and having an adjustable length rod connected to said unit, said crank having an over dead-center position respecting said rod when the unit is in the drive position, and lever arm and crank means connected to said first-named crank and operable by the lever arm, said lever arm and crank means being operable to dispose said crank in said position securing the unit in drive position, and said lever and crank means being itself movable to an over dead-center position to dispose and secure said first-named crank and the unit in non-driving position, both said crank and said lever arm and crank means being carried by said column whereby the adjustment of the rod compensates for the adjustment of the column without affecting the relationship of the crank and the lever arm and crank means.

References Cited in the file of this patent

UNITED STATES PATENTS

| | | |
|---|---|---|
| 689,217 | Palmer | Dec. 17, 1901 |
| 1,554,744 | Mack | Sept. 22, 1925 |
| 2,069,245 | Haines | Feb. 2, 1937 |
| 2,070,288 | Mack | Feb. 9, 1937 |
| 2,284,441 | Murad | May 26, 1942 |
| 2,453,999 | Melling | Nov. 16, 1948 |
| 2,479,931 | Howard | Aug. 23, 1949 |
| 2,523,171 | Willey | Sept. 19, 1950 |
| 2,598,768 | Donald | June 3, 1952 |